United States Patent
Morton et al.

(10) Patent No.: US 10,162,071 B1
(45) Date of Patent: *Dec. 25, 2018

(54) 3D BLENDING AND ILLUMINATION OF SEISMIC VOLUMES FOR AUTOMATIC DERIVATION OF DISCONTINUITIES

(71) Applicant: Saudi Arabian Oil Company, Dhahran (SA)

(72) Inventors: Andrew M. Morton, Rabwah (SA); Roger R. Sung, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,863

(22) Filed: Aug. 31, 2018

Related U.S. Application Data

(63) Continuation of application No. 15/013,717, filed on Feb. 2, 2016.

(51) Int. Cl.
*G01V 1/36* (2006.01)
*G01V 1/34* (2006.01)
(Continued)

(52) U.S. Cl.
CPC .............. *G01V 1/364* (2013.01); *G01V 1/302* (2013.01); *G01V 1/345* (2013.01); *G06T 5/00* (2013.01);
(Continued)

(58) Field of Classification Search
CPC ...... G01V 99/005; G01V 1/364; G01V 1/345; G01V 1/28; G01V 1/301; G01V 1/302;
(Continued)

(56) References Cited

U.S. PATENT DOCUMENTS 5,724,309 A * 3/1998 Higgs ..................... G01V 1/32
367/48
5,940,778 A 8/1999 Marfurt et al.
(Continued)

FOREIGN PATENT DOCUMENTS

WO 2015/040375 3/2015

OTHER PUBLICATIONS

International Search Report and Written Opinion issued in International Application No. PCT/US2016/064009 dated Mar. 9, 2017.

*Primary Examiner* — Jonathan Han
(74) *Attorney, Agent, or Firm* — Fish & Richardson P.C.

(57) ABSTRACT

The present disclosure describes computer-implemented methods, computer-program products, and computer systems, for providing parameters for successful automated fault patch extraction. Attributes are selected for annotating images generated from, and for interpretation of, seismic amplitude volume. Images are generated from layers of a seismic cube, each generated using a different attribute of the plural attributes. The plural images are blended using customized palettes and initial parameters to create a blended image illuminating discontinuities in the layers. Optimal parameters are iteratively determined for automatic derivation of fault discontinuities on an interpreter-selected edge-enhanced sub-volume. The iterations are controlled and terminated based on interpreter inputs. The optimal extraction parameters are applied to an entire edge-enhanced volume. Important extracted fault discontinuities are isolated using commercial filtering tools. Extracted fault patches are refined based on received manual interpretation. Patch results are converted to traditional fault objects for further interpretation and refinement.

6 Claims, 16 Drawing Sheets

(51) Int. Cl.
*G01V 1/30* (2006.01)
*G06T 17/05* (2011.01)
*G06T 7/00* (2017.01)
*G06T 5/00* (2006.01)
*G06T 15/00* (2011.01)

(52) U.S. Cl.
CPC ............... *G06T 7/00* (2013.01); *G06T 15/00* (2013.01); *G06T 17/05* (2013.01); *G01V 2210/642* (2013.01); *G06T 2207/10028* (2013.01); *G06T 2207/20192* (2013.01); *G06T 2207/20221* (2013.01); *G06T 2207/30108* (2013.01)

(58) Field of Classification Search
CPC ......... G01V 2210/64; G01V 2210/642; G01V 1/32; G01V 2210/74
USPC .............................................. 702/14, 16, 17
See application file for complete search history.

(56) References Cited

U.S. PATENT DOCUMENTS

| | | |
|---|---|---|
| 6,131,071 A | 10/2000 | Partyka et al. |
| 6,141,622 A | 10/2000 | Keller et al. |
| 6,516,274 B2 | 2/2003 | Cheng et al. |
| 7,069,149 B2 * | 6/2006 | Goff .................. G01V 1/30 702/16 |
| 7,113,869 B2 | 9/2006 | Xue |
| 8,340,912 B2 | 12/2012 | Skripkin |
| 8,600,708 B1 * | 12/2013 | Mallet ................ G06T 17/05 703/2 |
| 9,105,075 B1 | 8/2015 | Yu et al. |
| 2005/0110795 A1 | 5/2005 | Sheffield et al. |
| 2011/0254843 A1 | 10/2011 | Chuter |
| 2013/0030777 A1 * | 1/2013 | Sung ................ G01V 99/00 703/6 |
| 2014/0278117 A1 | 9/2014 | Dobin et al. |
| 2015/0234067 A1 | 8/2015 | Purves et al. |
| 2016/0195625 A1 * | 7/2016 | Mcardle ............. G01V 1/345 702/16 |

* cited by examiner

3D BLENDING AND ILLUMINATION OF SEISMIC VOLUMES FOR AUTOMATIC DERIVATION OF DISCONTINUITIES

CROSS-REFERENCE TO RELATED APPLICATIONS

This application is a Continuation Application of and claims the benefit of priority to U.S. patent application Ser. No. 15/013,717, filed on Feb. 2, 2016, the contents of which are hereby incorporated by reference.

BACKGROUND

For many decades, geophysicists have strived to extract and utilize information from seismic data to generate oil and gas prospects. For example, the identification and interpretation of fault discontinuities can be critical to their success because faults are natural barriers that can prevent (or facilitate) fluid flow and often provide the essential trap for hydrocarbon reservoirs. Delineating and interpreting such discontinuities rapidly under today's increasingly challenging environment can depend, for example, on effective use of the best methodologies and technologies, but this is not necessarily done in practice. For example, while valuable information about seismic discontinuities may be encompassed in 3D seismic volumes, extracting and utilizing the information may not be achieved in practice.

SUMMARY

The present disclosure describes methods and systems, including computer-implemented methods, computer-program products, and computer systems, for providing parameters for successful automated fault patch extraction. Plural attributes are selected for annotating images generated from, and for interpretation of, seismic amplitude volume. Plural images are generated from a set of layers of a seismic cube, each image generated using a different attribute of the plural attributes. The plural images are blended using customized palettes and initial parameters for each of the plural images. The blending creates a blended image that illuminates discontinuities in the set of layers. Optimal parameters are iteratively determined for automatic derivation of fault discontinuities on an interpreter-selected edge-enhanced sub-volume. The iterations are controlled and terminated based on inputs from an interpreter. The optimal extraction parameters are applied to an entire edge-enhanced volume. Important extracted fault discontinuities are isolated using commercial filtering tools. Extracted fault patches are refined based on received manual interpretation from the interpreter. Patch results are converted to traditional fault objects for further interpretation and refinement.

These methods, computer-program products, and computer systems described herein can utilize commercially available seismic attributes and exploration software. The techniques described below provide a methodology for revealing potentially hidden discontinuities in seismic data and improving automated fault extraction results. For example, more visible and meaningful discontinuities and faults can be converted back to conventional fault objects for further interactive interpretation. A workflow methodology is described below that blends varying percentages of multiple 3D seismic volume attributes to optimally illuminate and automatically interpret fault discontinuities in seismic data. The workflow can significantly improve overall turnaround time and can enhance the process of delineating structural seal and leak potential required during prospect generation.

In some implementations, an original seismic amplitude volume can be used as input to generate three additional attribute volumes, referred to in this text as pre-conditioned, edge-detected, and edge-enhanced attributes. These attribute volumes can be initially viewed individually, and their characteristics can be enhanced by applying specific color palette customization to emphasize potential fault discontinuities. Each of the volumes can be optimized in this way before blending the volumes together by applying appropriate transparencies to illuminate the seismic discontinuities to their full extent. The successful implementation of this stage can be critical in determining meaningful results in the subsequent automated fault extraction and interpretation.

After illumination of the discontinuities by volume blending, optimal extraction parameters can be determined iteratively over a representative sub-volume, before applying refined parameters to the full data extent. Waiting to use the full data extent is necessary because the automated extraction process is typically CPU-intensive and may take many hours to complete on a large, 3D seismic volume. The specific parameters applied can depend on the commercial software being used as well as the characteristics and quality of the input seismic data. Each geological scenario can typically require its own unique extraction parameters.

The extracted discontinuities can then be filtered using software tools, such as a stereonet, for directional fault attributes that are symptomatic of prevailing geological stress fields. Also, histogram tools can be used to isolate discontinuities based on other properties such as dip azimuth, surface area, confidence, extent, and other properties. The isolated extracted results can then be interpreted and combined into meaningful geological discontinuities using tools (e.g., merge, smooth, interpret, extend, and delete) before finally converting the isolated extracted results to normal fault interpretation objects for further refinement in the interpretation process. Using this process, extracted results can be produced in a matter of hours, followed by further manual refinement by the interpreter, before converting the results to traditional fault objects. This undertaking can otherwise require many weeks to interpret using traditional non-automated fault interpretation methods.

By incorporating components of automation and critical human input, the techniques described herein can deliver rapid, objective, and subjective interpretation of fault discontinuities that can significantly improve prospect generation turnaround time. The innovation can be independent of specific software and can be applied using industry recognized seismic exploration applications that use appropriate multi-volume seismic attributes. The quality of the results can be heavily influenced by the quality and effectiveness of blending during the initial stages, and also by the subsequent selection of parameters used for automatic fault extraction. The extracted results can be refined into meaningful discontinuities by the interpreter and then converted into regular fault data for final interpretation.

The techniques described herein can combine efficiencies of process and algorithmic objectivity in generating automated extracted results with the essential human control, e.g., that is necessary to guide the process by blending and illumination of discontinuities in the initial stages and by manual refinement of the extracted results in the latter stages.

Other implementation aspects of the techniques described herein can include corresponding computer systems, apparatuses, and computer programs recorded on one or more computer-readable media/storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, one computer-implemented method can include: selecting plural attributes for annotating images generated from, and for interpretation of, seismic amplitude volume; generating plural images from a set of layers of a seismic cube, each image generated using a different attribute of the plural attributes; blending the plural images, using customized palettes and initial parameters for each of the plural images, the blending creating a blended image that illuminates discontinuities in the set of layers; iteratively determining optimal parameters for automatic derivation of fault discontinuities on an interpreter-selected edge-enhanced sub-volume, wherein iterations are controlled and terminated based on inputs from an interpreter; applying the optimal extraction parameters to an entire edge-enhanced volume; isolating important extracted fault discontinuities using commercial filtering tools; refining extracted fault patches based on received manual interpretation from the interpreter; and converting patch results to traditional fault objects for further interpretation and refinement.

The foregoing and other implementations can each optionally include one or more of the following features, alone or in combination:

A first aspect, combinable with the general implementation, wherein the method further comprises receiving the seismic cube.

A second aspect, combinable with any of the previous aspects, wherein the plural attributes include pre-conditioned seismic attributes, edge-detection attributes, and edge-enhanced attributes, and wherein blending the plural images includes blending images generated from the pre-conditioned seismic attributes, the edge-detection attributes, and the edge-enhanced attributes.

A third aspect, combinable with any of the previous aspects, wherein the optimal parameters for the pre-conditioned seismic attributes, the edge-detection attributes, and the edge-enhanced attributes include opacities of 70%, 40%, and 30%, respectively.

A fourth aspect, combinable with any of the previous aspects, wherein the initial parameters include a 10% extraction sampling threshold.

The subject matter described in this specification can be implemented in particular implementations so as to realize one or more of the following advantages. First, identification of discontinuities during prospect generation can be critical to the viability of a potential prospect. For example, failure to identify structural seals or barriers that impact hydrocarbon migration can result in the prospect being misinterpreted or even completely overlooked, costing potentially millions of dollars to a company. Second, discontinuities that are clearly visible using techniques described herein may be almost entirely concealed using other techniques. For example, critical seismic discontinuities may be hidden to the interpreter if inadequate methodologies or limited software capabilities are applied during the interpretation process. Third, the techniques combine automation and human input to maximize interpretation results and also reduces turnaround time, saving potentially millions of dollars. Fourth, the techniques described herein can utilize industry recognized seismic attributes and can incorporate the attributes into a comprehensive methodology for automated interpretation of seismic discontinuities. Fifth, workflows described herein can combine advanced illumination methodologies with a robust procedure for maximizing the potential of automatic fault extraction algorithms. When these component parts are used in conjunction, then the overall benefits can far exceed the sum of their individual parts. For example, the individual seismic attributes are of reduced value if they are not effectively blended together and illuminated to maximize the information contained within them. Further, automated fault extraction algorithms are less effective if they are not guided by human input, which must first be determined by illumination of the information contained within the seismic data. Sixth, the combination of elements in the workflow described below can provide a geophysical interpreter with a methodology that can ensure quick delivery of interpretation results leveraging the finest aspects of automation and human input to deliver high-value results in the prospect generation process. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
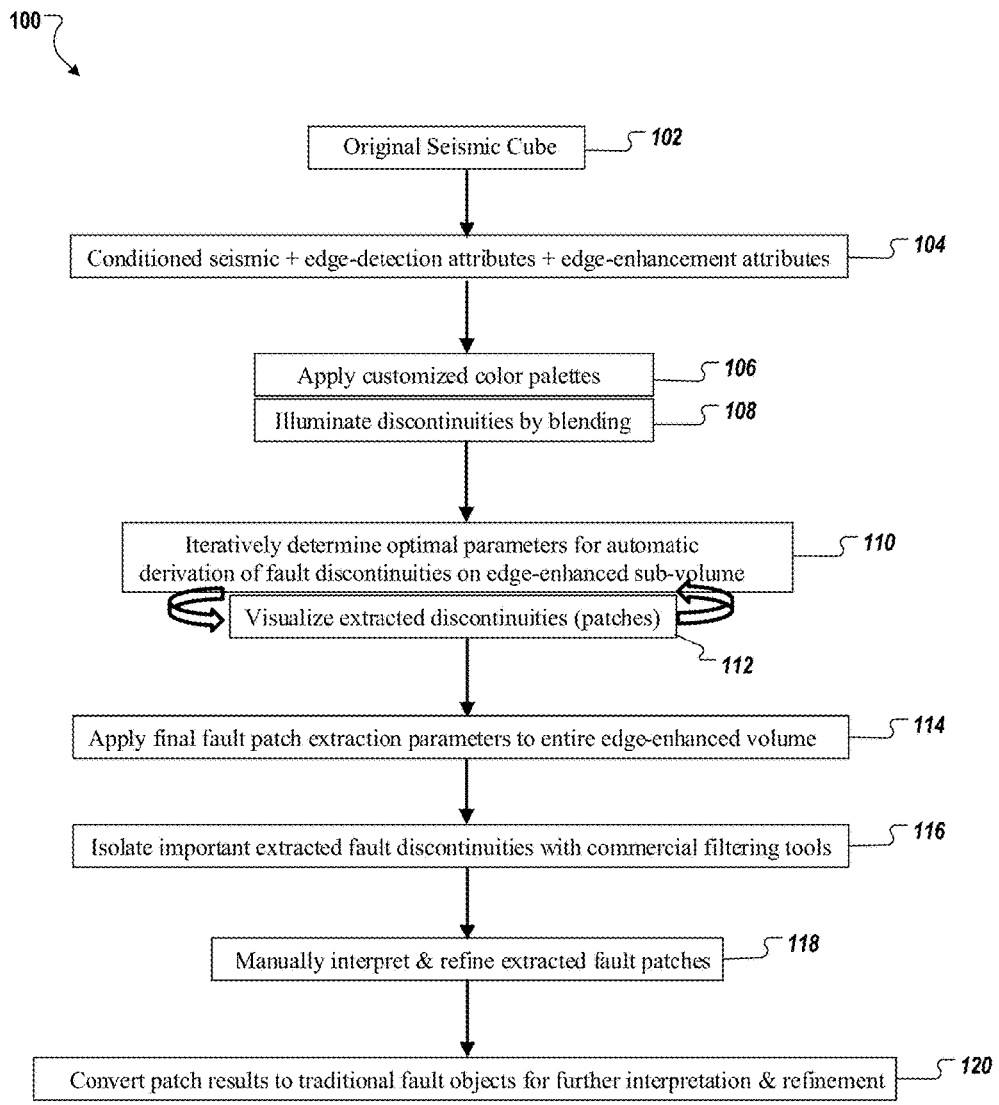
FIG. 1 is a flow diagram of an example workflow for blending multiple 3D seismic volume attributes and applying techniques to make discontinuities stand out, according to an implementation.

This disclosure generally describes methods and systems, including computer-implemented methods, computer-program products, and computer systems, for providing parameters for successful automated fault patch extraction.

The following subject matter is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein. Additionally, although images shown in the included figures are presented in grayscale, implementations involving color palettes can be used and can provide color-annotated results that are more easily processed visually by a user.

In typical implementations, specific blending parameters and customized color palettes of industry standard conditioned seismic, edge-detection attributes, and edge-enhancement attribute cubes can be combined to effectively illuminate discontinuities, which can then be used to facilitate an iterative refinement of parameters for successful automated fault patch extraction. As a result, important seismic discontinuities that might otherwise remain hidden using traditional methodologies can be effectively illuminated, and turnaround time for iterative automated fault extraction and interpretation can be decreased.

Discontinuities in seismic data are generally caused by changes of physical rock properties within a short distance. For example, rock properties that effect seismic response include, but are not limited to, density, velocity, and porosity. The possible causes of sudden rock property changes can be diverse and may be due to earth movement (e.g., faulting/fracturing), variations in depositional process (e.g., lithology variation), an interruption of sedimentation and subsequent erosion (e.g., unconformity), or other causes. Movement of intrusive entities, such as salt or igneous intrusions, can also induce stress buildup and can cause faulting and fracturing. A sudden change of rock properties can have major implications for the viability of a potential prospect or field development, which is why the identification of discontinuities is of paramount importance.

In some implementations, seismic data can include reflections collected from acoustic waves traversed through the strata beneath the earth's surface. When rock properties change in a faulted, fractured or unconformable environment, for example, the change in acoustic impedance can produce a reflection that is recorded at the receiver. This seismic record can be used to understand the subsurface geometry and detect subtle differences in rock property and displacement. Rock movement over millions of years can produce a complex and sometimes noisy seismic signature that can mask important discontinuities, which if overlooked can have major repercussions, for example, for prediction of reservoir seal and fluid flow.

This disclosure describes an example workflow to blend multiple 3D seismic volumes and apply illumination techniques to make discontinuities stand out and improve the iterative process of automatic derivation of discontinuities. For example, different seismic attributes such as structural smooth, edge-detection, coherency, chaos, or edge-enhanced attributes, all contain varying degrees of information related to reservoir discontinuities. The different seismic attributes may, however, also contain undesirable characteristics that reduce their effectiveness when used independently. In some implementations, by illuminating a percentage of each volume and applying specific color palettes to each attribute, it can be possible to blend multiple 3D seismic attribute volumes together to emphasize discontinuities. Once the discontinuities are illuminated for example, iterative adjustment of fault patch extraction parameters using commercial exploration tools can be made much easier. By adjusting extraction sampling thresholds, connectivity constraints, and minimum fault patch size, for example, the important discontinuities can be automatically derived, isolated, and interpreted. The more meaningful discontinuities and extracted fault patches can then be converted and incorporated into traditional interpretation processes. The automatically extracted components can provide, for example, an effective starting point in prospect generation that is both quick and accurate, which can then be refined by traditional interpretation.

The majority of seismic data acquired for exploration and analysis of reservoirs can be based, for example, on seismic reflection technology. For example, 3D seismic data can provide a 3-dimensional representation of reservoir geometry beneath the earth's surface. Geological structures and rock discontinuities can be imaged on seismograms, e.g., to enable identification of structural seals for hydrocarbon traps or, conversely, to enable identification of pathways for hydrocarbon escape. It can therefore be critical to be able to identify and delineate rock discontinuities early in the prospect generation process.

A seismic cube is a 3D representation of reflected acoustic waves from the earth's subsurface. The seismic cube can be recorded either onshore or offshore by service companies using seismic acquisition technology. An example acquisition company is WESTERN GECO. The seismic cube can be stored in a Society of Exploration Geophysicists (SEGY) format and can be represented and/or stored in a standard industry format that can be imported into commercially available exploration software, such as PETREL. Seismic acquisition is a major component of oil exploration and is a cost-effective way of imaging large areas without drilling multi-million dollar exploration wells. In typical implementations, a seismic cube can range in size from a few megabytes (MB) to multiple gigabytes (GB) of data.

Physical rock properties change over geological time. Although minor changes can be readily observed in rock outcrops, the changes may not necessarily be apparent in the seismic record. For example, seismic reflections, by nature, are a product of many complex interactions, and noise can often mask important reflections from what can be critical discontinuities of a potential reservoir. Finding ways to reduce the undesirable effects of noise, while enhancing meaningful reflections in 3D seismic data, for example, can be a continual challenge in the exploration process.

FIG. 1 is a flow diagram of an example workflow 100 for blending multiple 3D seismic volume attributes and applying techniques to make discontinuities stand out, according to an implementation. For example, the workflow 100 can be used with techniques described herein to blend multiple 3D seismic volume attributes.

At 102, the workflow 100 begin with a received seismic cube. For example, the received seismic cube can include seismic data in three dimensions, providing a 3D representation of reflected acoustic waves from the earth's subsurface. The X and Y dimensions of the seismic cube can be associated with a two-dimensional representation of the earth's surface. The Z dimension of the seismic cube can correspond to time, e.g., with each Z-dimension slice in the seismic cube corresponding to a different time (or the Z-dimension can correspond to depth). As described above, the seismic cube can be recorded either onshore or offshore by service companies using seismic acquisition technology. Information from the seismic cube can be used, for example, to generate images shown in FIGS. 5-15. From 102, workflow 100 proceeds to 104.

At 104, different seismic attributes can be extracted from the seismic cube. In typical implementations, the seismic attributes can include, for example, pre-conditioned seismic attributes, various edge-detection attributes, and edge-enhanced attributes, among other attributes. Each attribute is optimized independently by refinement of associated parameters. The attributes can contain and/or be associated with information that is related, for example, to geological discontinuities. For example, images associated with pre-conditioned seismic attributes, various edge-detection attributes, and edge-enhanced attributes are described below with reference to FIGS. 6, 7, and 8, respectively. From 104, workflow 100 proceeds to 106.

At 106, customized color palettes are applied. For example, color spectrums 1402, described below with reference to FIG. 14, can be applied. From 106, workflow 100 proceeds to 108. For example, an image illustrating edge-enhanced volume using an enhanced color palette is described below with reference to FIG. 8.

At 108, blending can be used to illuminate discontinuities. For example, illuminating a percentage of each volume of the attributes, manipulating color palettes (e.g., to enhance contrast), and blending the attributes together can reveal previously hidden discontinuities. For example, an image illustrating initial 3D blended volumes is described below with reference to FIG. 9, and image illustrating optimally 3D blended and illuminated seismic cubes is described below with reference to FIG. 10. From 108, workflow 100 proceeds to 110. Blending the plural images can include using specific customized color palettes (e.g., color spectrums 1402 described below with reference to FIG. 14).

At 110, the illuminated volume can then be used as a base to iteratively optimize sampling thresholds to capture minimum signal levels. For example, an image illustrating automatically extracted discontinuities is described below with reference to FIG. 11. The image is generated using an extraction sampling threshold of Top 10%, e.g., a minimum signal level from which to create extraction points. An image generated using the extraction sampling threshold of 50% is described below with reference to FIG. 12. From 110, workflow 100 proceeds to 112.

At 112, the results of 110 are visualized. The minimum signal levels are used to extract fault patches, voxel connectivity constraints, and minimal fault patch sizes for automated fault extraction. From 112, workflow 100 proceeds to 114. At 114, final fault patch extraction parameters are applied to the entire edge-enhanced volume. From 114, workflow 100 proceeds to 116. At 116, important extracted fault discontinuities are isolated, e.g., using commercial filtering tools. From 116, workflow 100 proceeds to 118. At 118, the automatically extracted discontinuities can then be refined manually, e.g., using commercial exploration software. From 118, workflow 100 proceeds to 120.

At 120, the patch results are converted to regular fault interpretation objects for further detailed interpretation and analysis. After 120, workflow 100 stops.

The value of the workflow 100 can include, for example, the ability of the workflow to effectively identify discontinuities that may otherwise be concealed in the seismic data. Further, the workflow 100 can also provide a significant reduction in turnaround time for interpreting large 3D survey areas. The automated component of deriving discontinuities can leverage algorithmic objectivity, which is exclusively data dependent with human control and guidance to improve final interpretation accuracy.

Figure 2:
FIG. 2 is a table listing example parameters used for automatic discontinuity extraction, according to an implementation.

FIG. 2 is a table 200 listing example parameters used for automatic discontinuity extraction, according to an implementation. For example, the parameters can be provided by (and/or included in) commercially available exploration software. As such, a person of skill in the art can use such commercially available exploration software in support of the techniques described herein.

Figure 3:
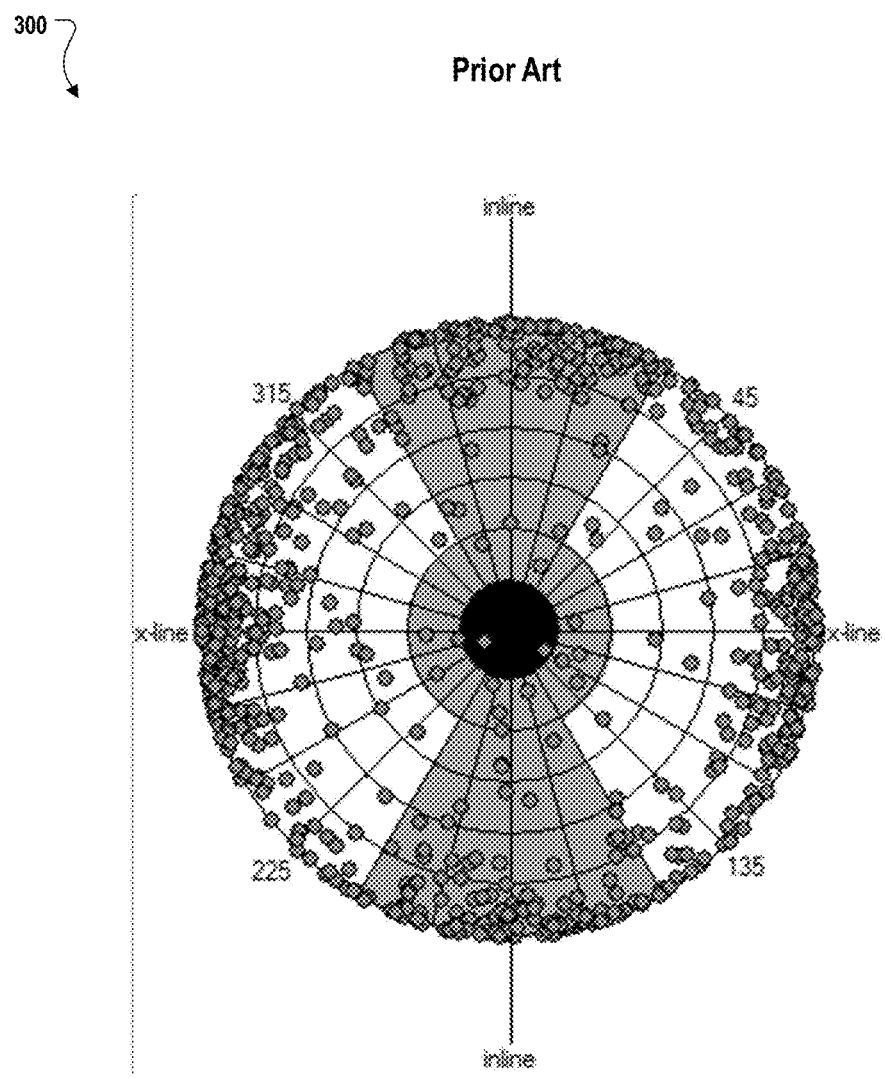
FIG. 3 is a diagram showing an example stereonet plot showing filtered extracted discontinuities, according to an implementation.

FIG. 3 is a diagram showing an example stereonet 300 plot showing filtered extracted discontinuities, according to an implementation. For example, the discontinuities can be filtered according to tectonic stress fields and dip orientation, e.g., using commercially available exploration software.

Figure 4:
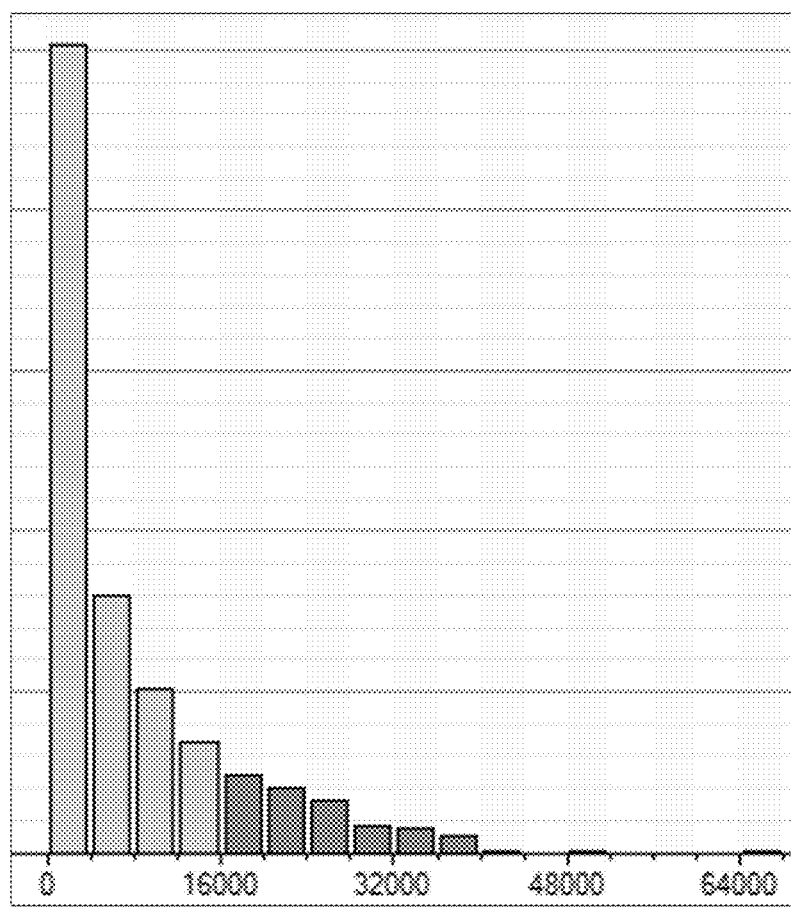
FIG. 4 is a diagram illustrating an example histogram graphically representing a filtering of extracted discontinuities by properties, according to an implementation.

FIG. 4 is a diagram illustrating an example histogram 400 graphically representing a filtering of extracted discontinuities by properties, according to an implementation. For example, histogram plotting and associated properties can be provided by commercially available exploration software. The properties can include, for example, dip azimuth, dip, surface area, azimuth in seismic, dip in seismic, confidence, and extent.

In an example that follows, described with reference to FIGS. 5-13, data and results are based on a representative seismic time section in the Red Sea at a depth of −1128 ms. The examples illustrate how seismic discontinuities can be concealed unless effective methodologies are used to illuminate them.

Figure 5:
FIG. 5 shows an image illustrating an original seismic volume, according to an implementation.

FIG. 5 shows an image 500 illustrating an original seismic volume, according to an implementation. For example, the image 500 shows seismic data of a time slice at −1128 ms. As shown, the fault discontinuities are indistinct even though the seismic quality is good. The volume provides clear information relating to seismic horizons. A palette 502 indicates a spectrum of colors representing changes in the image.

Figure 6:
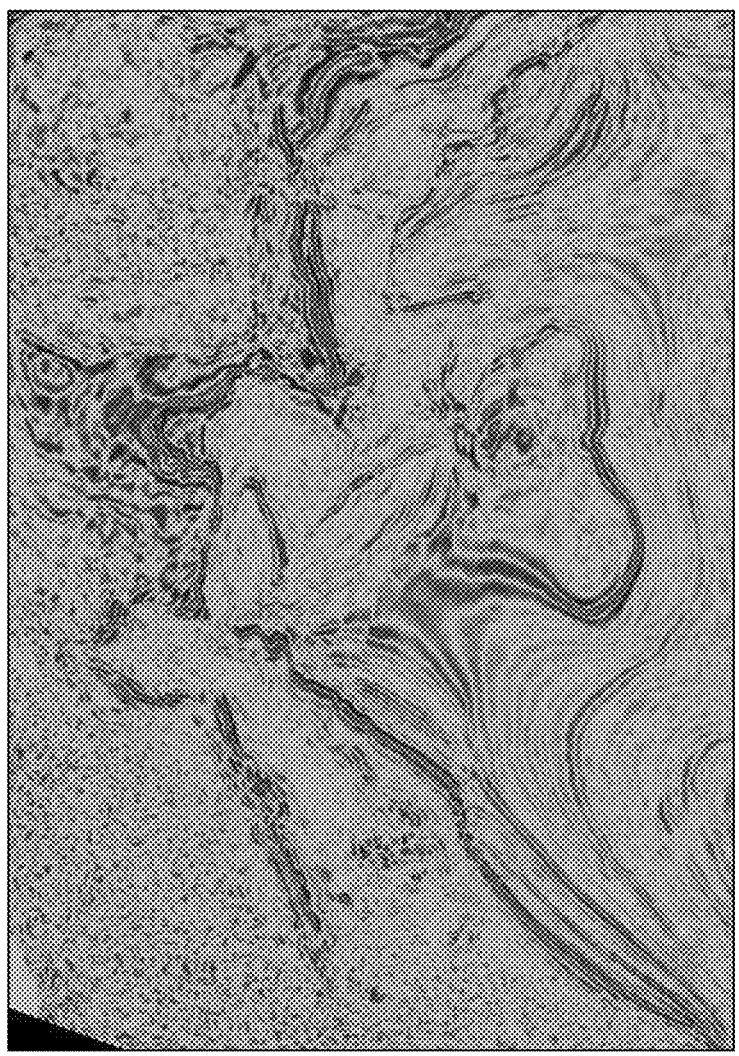
FIG. 6 shows an image illustrating pre-conditioned seismic volume, according to an implementation.
Figure 6:
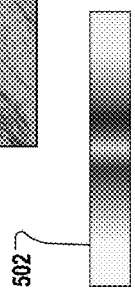

FIG. 6 shows an image 600 illustrating pre-conditioned seismic volume, according to an implementation. For example, the original seismic volume can be pre-conditioned by smoothing or averaging, which can remove noise and slightly improve the clarity of the fault discontinuities. This attribute volume provides better continuity of seismic horizons.

Figure 7:
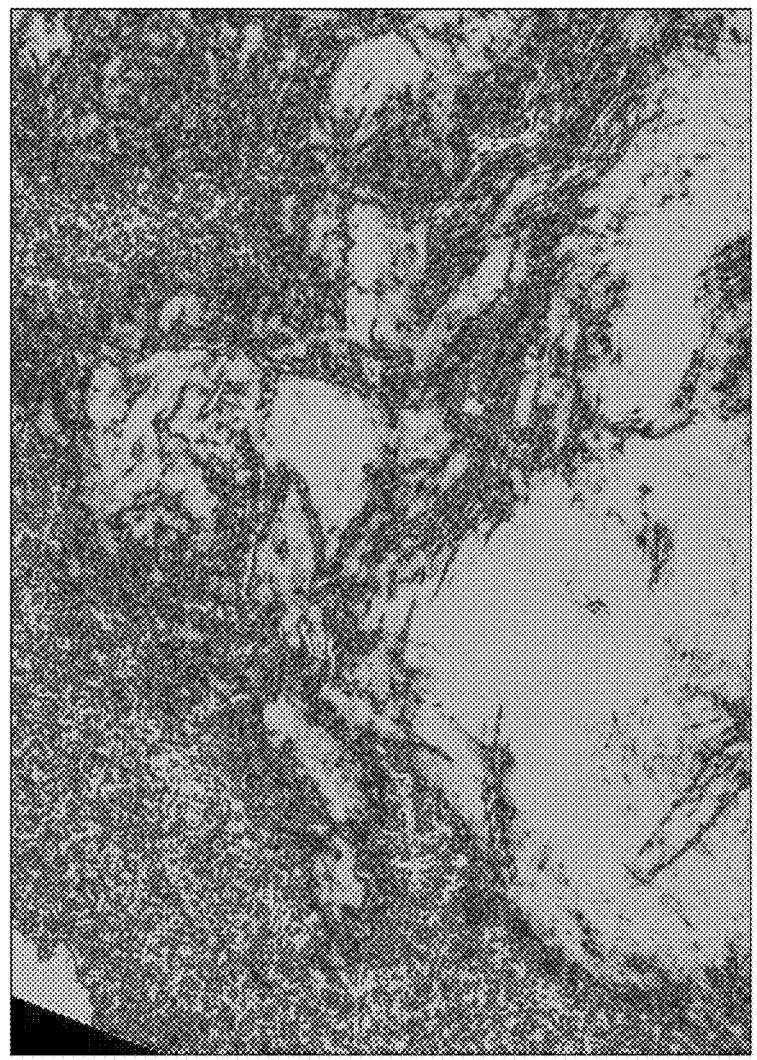
FIG. 7 shows an image illustrating edge-detected volume, according to an implementation.
Figure 7:

FIG. 7 shows an image 700 illustrating edge-detected volume, according to an implementation. For example, this volume attribute can emphasize the degree of similarity or semblance of the seismic data and can provide more information about lithological variation. The volume attribute also clarifies some major discontinuities in the lower left of the image.

Figure 8:
FIG. 8 shows an image illustrating edge-enhanced volume using an enhanced color palette, according to an implementation.

FIG. 8 shows an image 800 illustrating edge-enhanced volume using an enhanced color palette, according to an implementation. For example, the edge-enhanced volume contains much clearer information of seismic discontinuities when the attribute is enhanced using a customized color palette. Discontinuities that were previously concealed on other volumes are clearly illuminated. Conversely, information relating to seismic horizons or lithology variation is almost totally absent. An interpreter applying inappropriate color rendering methodology with standard color settings may not be able to see these details and would therefore be unable to effectively interpret the data.

Figure 9:
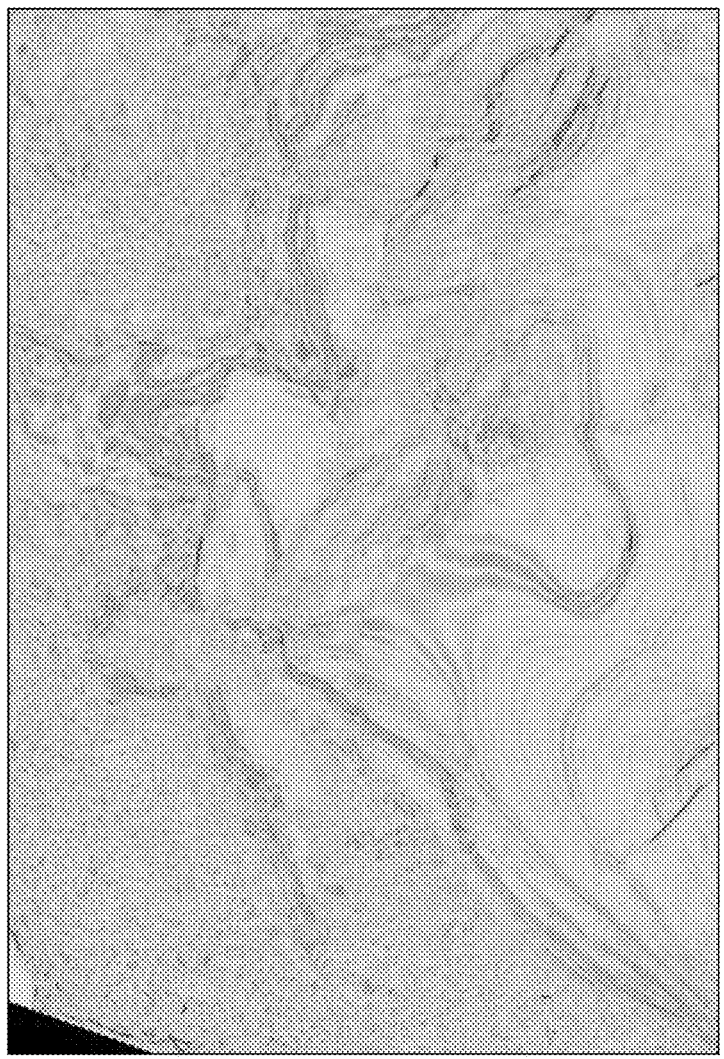
FIG. 9 shows an image illustrating initial 3D blended volumes, according to an implementation.

FIG. 9 shows an image 900 illustrating initial 3D blended volumes, according to an implementation. For example, the image 900 is a result of blending the pre-conditioned seismic volume of FIG. 6, the edge-detected of FIG. 7, and edge-enhanced volume of FIG. 8. When the blending of attribute volumes is unclear, it may be due to incorrect methodology, poor color representation, or incorrect opacity settings. In this example, the color representation applied to the edge-enhanced attribute is the default, which fails to reveal the hidden discontinuities in the volume.

Figure 10:
FIG. 10 shows an image illustrating optimally 3D blended and illuminated seismic cubes, according to an implementation.

FIG. 10 shows an image 1000 illustrating optimally 3D blended and illuminated seismic cubes, according to an implementation. For example, the image 1000 illustrates the effects of blending the pre-conditioned, edge-detected, and edge-enhanced cubes. When the three component volumes are blended together, e.g., using optimal transparency settings and color palettes, the discontinuities are clearly illuminated. For example, the blended display shows lithological variation from the edge-detected attribute, continuous seismic horizon detail from the pre-conditioned seismic attribute, and exceptional detail of structural discontinuities from the edge-enhanced attribute. Blending for the image 1000 uses, for example, illumination opacities for each of the three volumes as shown in Table 1:

TABLE 1

| Illumination Opacities | |
|---|---|
| Attribute Volume | Illumination Opacity % |
| Pre-conditioned | 70% |
| Edge-detected | 40% |
| Edge-enhanced | 30% |

The optimally illuminated result shown in FIG. 10 can then be used to guide an iterative process of determining the most effective settings for the automated fault extraction.

For an automatic derivation of discontinuities, it is essential to have achieved effective illumination of discontinuities through blending and color manipulation of multiple seismic attributes prior to commencing the iterative automated derivation of discontinuities. Without clear illumination, it is impractical to determine optimal extraction parameters because the interpreter cannot see the faults that he aims to extract. The following examples demonstrate how an interpreter can iteratively adjust the extraction parameters to achieve meaningful results.

Figure 11:
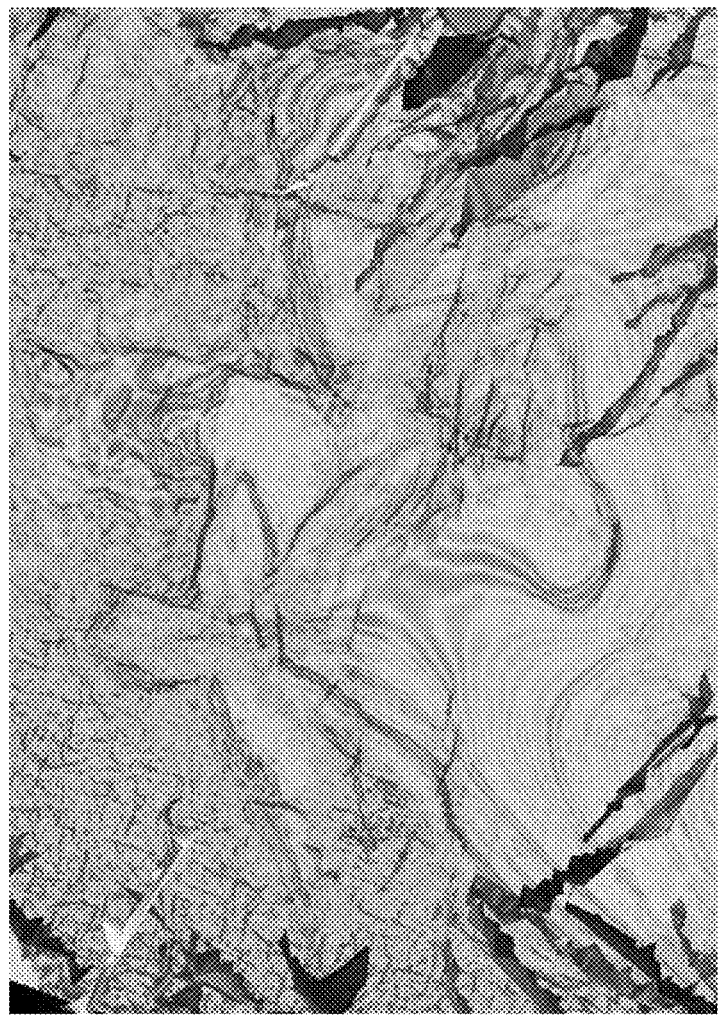
FIG. 11 shows an image illustrating automatically extracted discontinuities, according to an implementation.

FIG. 11 shows an image 1100 illustrating automatically extracted discontinuities, according to an implementation. The extraction sampling threshold (e.g., a minimum signal level from which to create extraction points) in this case is set to a top 10%, which only extracts the highest data values. In addition, using the highest connectivity constraint values—an extracted discontinuity must have voxel connectivity on 1, 2 or 3 faces to be included in the results—means that only high-confidence faults are extracted. As a result, for the image 1100, the automatic extraction parameters are too constrained, causing the discontinuities in the central area to remain un-extracted.

Figure 12:
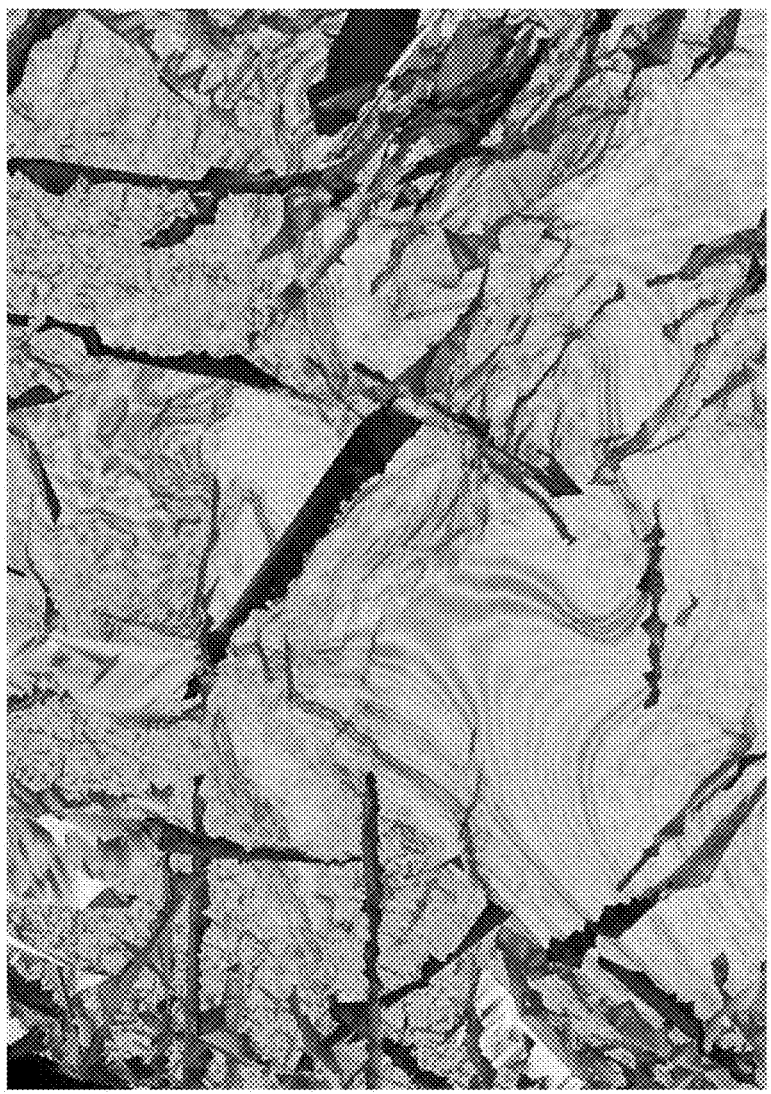
FIG. 12 shows an image illustrating automatically extracted discontinuities, according to an implementation.

FIG. 12 shows an image 1200 illustrating automatically extracted discontinuities, according to an implementation. In this example, the top 50% of values are used. By relaxing the extraction sampling threshold to 50%, but retaining a high connectivity constraint, for example, more discontinuities can be extracted in the central area. In this display, other extracted items that are not meaningful are filtered out. The iterative process can continue until optimal results are achieved.

The decision to terminate iterations can be made, e.g., by an interpreter based on human experience. Rather than using a particular quantitative value or threshold, a visual comparison of extracted faults with the blended image of seismic attributes can be made until the match appears to be satisfactory, as viewed by the interpreter. Extraction parameters can be refined on a sub-volume until the desired results are obtained.

Figure 13:
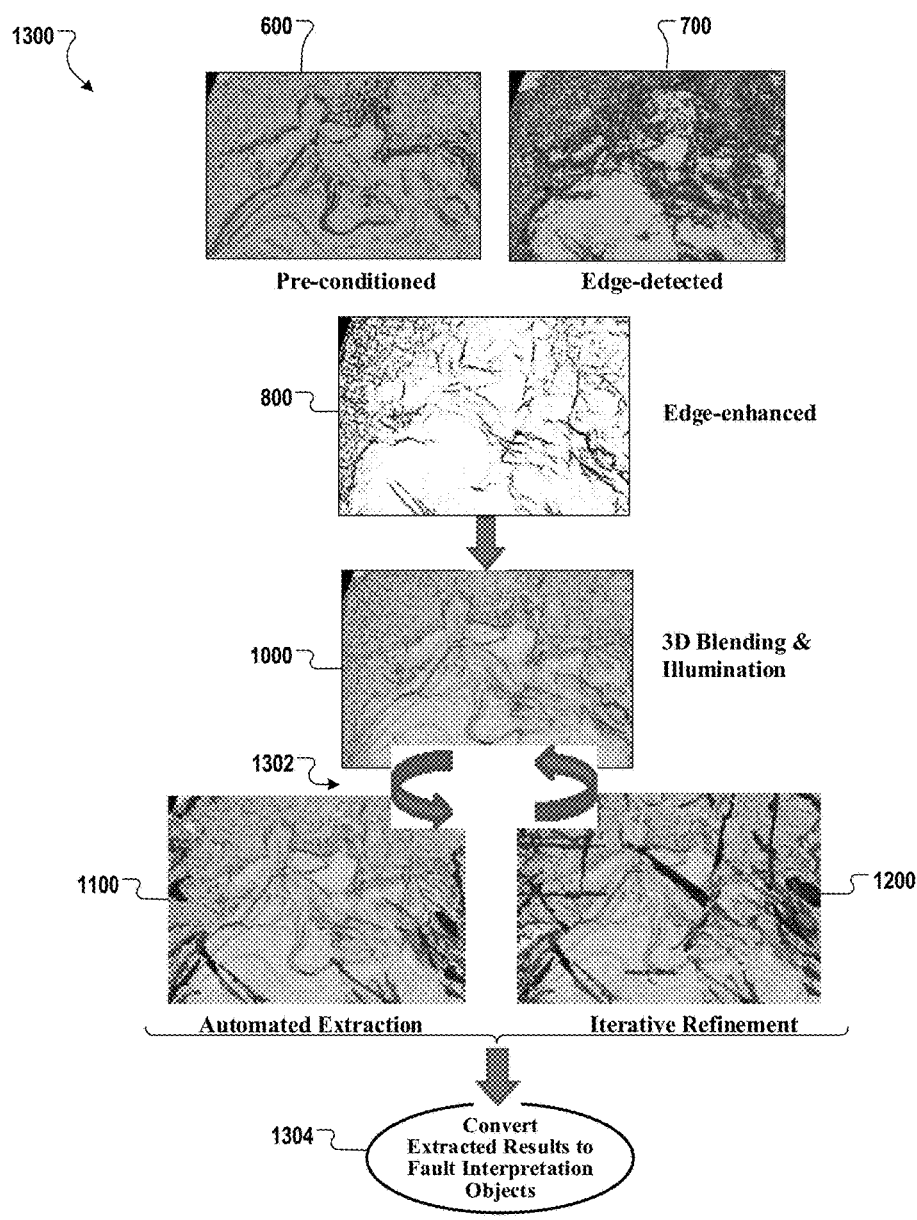
FIG. 13 shows an illustrative workflow for refining extraction results, according to an implementation.

FIG. 13 shows an illustrative workflow 1300 for refining extraction results, according to an implementation. For example, the workflow 1300 illustrates how images 600, 700, and 800 for pre-conditioned, edge-detected, and edge-enhanced volumes, respectively, are blended to create the image 1000. Further, an iterative process 1302 can be used to compare the extracted results with the image 1000 prior to conversion (1304) of extracted results to fault interpretation objects.

For example, the workflow 1300 can be used in a technique that includes the following steps. Seismic amplitude volumes are pre-conditioned through filtering and/or smoothing. The original seismic amplitude cube is used to create an optimal edge-detected attribute and optimal edge-enhanced cube to enhance lithology variation and discontinuities. The discontinuities of the edge-enhanced attribute are further enhanced by applying a custom color palette. The pre-conditioned, edge-detected, and edge-enhanced cubes 600, 700, 800 are blended to illuminate discontinuities, e.g., by varying opacity in each volume. Automated fault extraction parameters, e.g., an extraction sampling threshold and connectivity constraints, are iteratively applied to a cropped illuminated cube to derive optimal discontinuities. Optimal extraction parameters are applied to the full edge-enhanced cube. Stereonet and histogram tools can be used to isolate automatically extracted surfaces. A geophysical interpreter can manually refine and interpret key extracted surfaces. Final extracted surfaces are converted to conventional faults for detailed interpretation.

Figure 14:
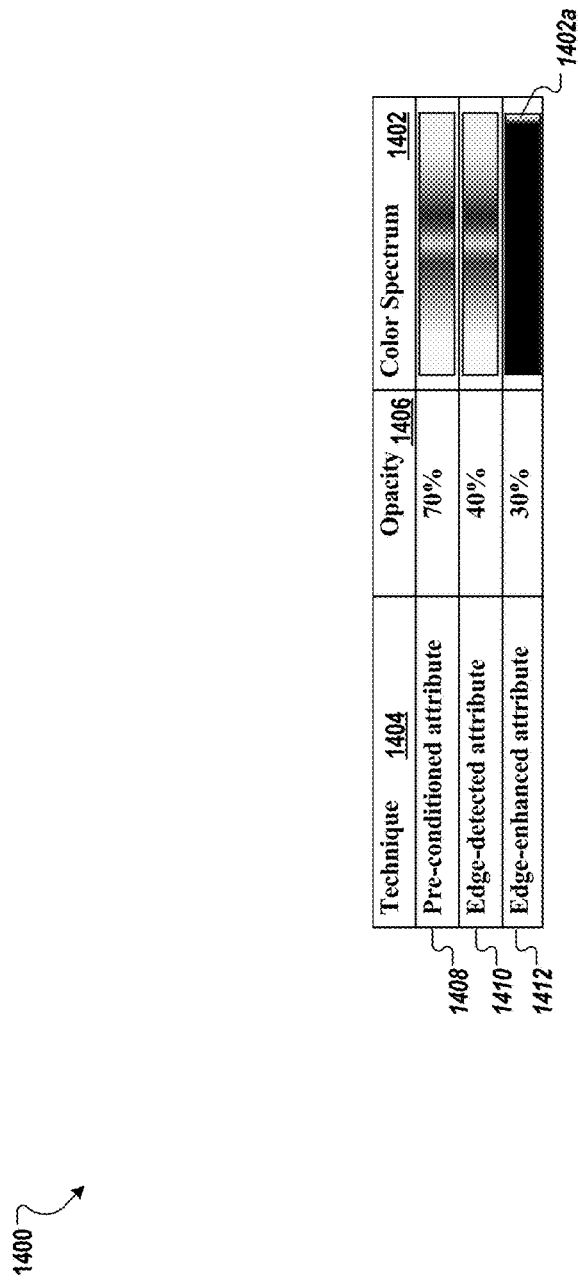
FIG. 14 illustrates a table of example color spectrums used for constraints, according to an implementation.

FIG. 14 illustrates a table 1400 of example color spectrums 1402 used for techniques 1404, according to an implementation. For example, to produce a result through interactions as described above, opacity percentages 1406 of 70%, 40%, and 30% can be used for the pre-conditioned attribute 1408, the edge-detected attribute 1410, and the edge-enhanced attribute 1412, respectively, in an iterative process for automated extraction of discontinuities. As shown, color spectrum 1402a is very specific for the edge-enhanced attribute 1412, as the extreme right end of the spectrum is white, as opposed to the majority being black.

In some implementations, the workflow described above can be accomplished with the following hardware configuration. In some implementations, a minimum hardware configuration for running PETREL geophysical workflows can include a dual monitor standard desktop computer running 64 bit MICROSOFT WINDOWS 7, 64 GB memory and dual quad-core processors. In some implementations, a preferred graphics desktop can be a NVIDIA QUADRO K5200 or K6000. In some implementations, primary storage can be fast rotational speed HDD (10K, 15K) or 300 GB SSD. This configuration can support processing of seismic cubes, for example, of at least 1.3 GB in size. Other hardware configurations consistent with this disclosure can be used and are considered to be within the scope of this disclosure.

The quality and usefulness of iterative fault extraction results can be directly proportional to a degree of illumination. For example, if the illumination methodology is bypassed or inadequately applied, then subsequent extraction results can also be sub-optimal. Therefore, an experienced interpreter can use his expertise to know when the illumination of discontinuities is optimal. For practical purposes, it is also necessary to determine the best fault extraction parameters on a representative sub-volume (e.g., a portion of the seismic cube), due to the heavy CPU requirements of the process. Meaningful parameters can be determined by an experienced geophysical interpreter, in that the extracted discontinuities must represent realistic geological discontinuities as represented in the illuminated volume. When meaningful parameters have been achieved, the parameters can then be applied to the entire data area (e.g., the entire seismic cube).

Algorithms, tools, and calculations used in the techniques described herein can be industry standard and are available using commercial software. For example smoothing tools can use a smoothing attribute (e.g., generated by Schlumberger Petrel commercial software) and additional attributes (e.g., Detect II and Skeleton, generated by Aramco in-house algorithms) which are forms of chaos and edge-enhancement attributes respectively. All three attributes can be generated, for example, with commercial algorithms that create similar output. The tools used for automatic fault extraction can be, for example, from commercially available Schlumberger Petrel software. The overall tool used to illustrate the inventive concept can be, for example, Schlumberger Petrel software, which is a main tool used in oil exploration.

Seismic attribute generating algorithms can be used to condition the original seismic data to illuminate the subsurface image. These attributes can be calculated with commercially available software as mentioned above. Examples include structural smooth, edge-detection, coherency, chaos, or edge-enhanced attributes. Tools used to blend the parameters, color palettes, and fault extraction parameters can include tools from Schlumberger Petrel software, although other commercial software can also be used for this purpose.

Example sources and descriptions for the techniques described herein are listed in Table 2. For example, the Table 2 lists expanded details for each of the workflow steps described above, including data inputs and outputs of each step:

TABLE 2

| Inputs/Outputs of Workflow | |
|---|---|
| Data Input | Description |
| Original seismic cube | SEGY format from seismic acquisition company |
| Generated Output | |
| Smoothed cube | SEGY attribute generated from input cube |
| Chaos cube | SEGY attribute generated from input cube |
| Edge-enhanced cube | SEGY attribute generated from input cube |
| Blended Output | |
| Graphically blended cube using specific color palettes and transparency parameters | Combined SEGY of generated output cubes with specific color palettes and transparency to illuminate faults |
| Automatically Extracted Faults | |
| Commercial Petrel software outputs 'fault patches' in internal format using a representative sub-volume for faster performance | Iteratively generate fault discontinuities from original seismic cube and view on blended seismic until the output matches the geometry of the 'illuminated' discontinuities of the blended cube. The iteration stops when the interpreter is satisfied that the match represents the imaged fault distribution. |
| Final Automatic Fault Extraction | |
| Run with optimal parameters determined from iteration | Performed on entire input seismic cube (this may take many hours depending on seismic cube size) |
| Refine Extracted Faults | |
| Manually refine automatically extracted faults | Merge, smooth fault output until satisfied the main elements are representative of the imaged blended seismic |
| Convert Extracted Faults | |
| Convert automatically extracted faults to traditional fault interpretation for further interpretation & analysis | Interpreter uses the extracted results to continue interpretation in a traditional way |

Figure 15:
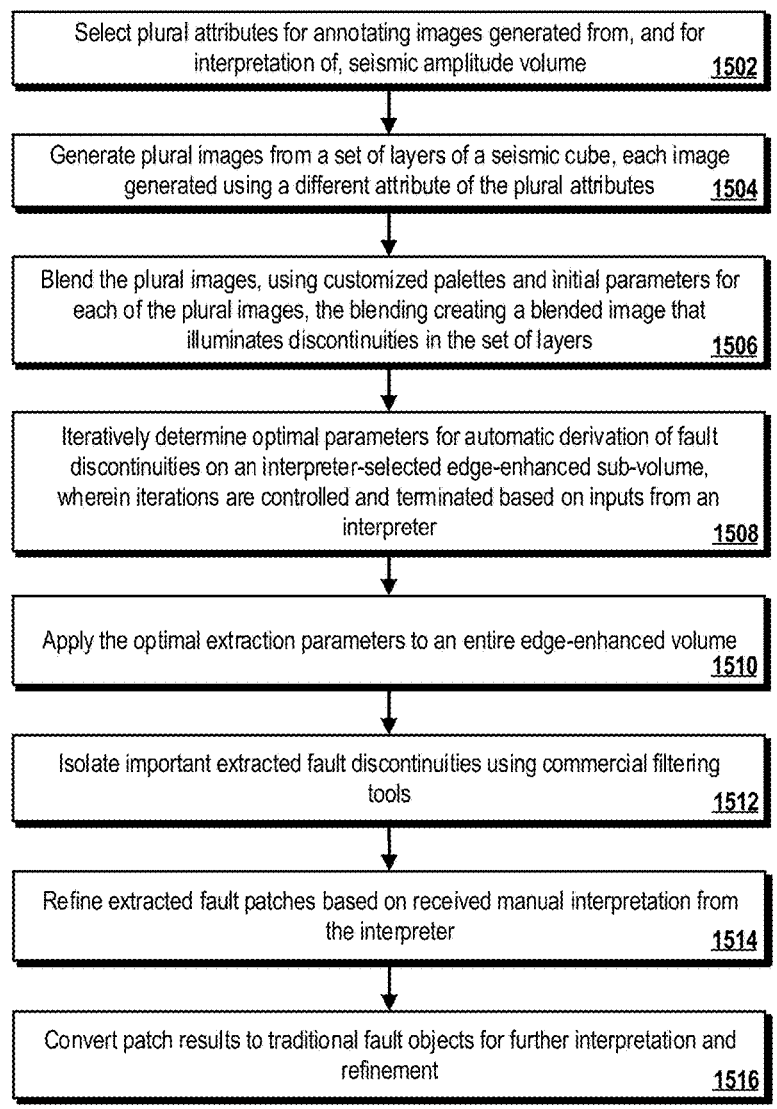
FIG. 15 illustrates a method 1500 for blending multiple 3D seismic volume attributes and applying techniques to make discontinuities stand out, according to an implementation.

FIG. 15 illustrates a method 1500 for blending multiple 3D seismic volume attributes and applying techniques to make discontinuities stand out, according to an implementation. For clarity of presentation, the description that follows generally describes method 1500 in the context of FIGS. 1-14. Method 1500 may be performed by any suitable system, environment, software, and/or hardware, or a combination of systems, environments, software, and/or hardware as appropriate (e.g., the computer system described in FIG. 16 below). In some implementations, various steps of method 1500 can be run in parallel, in combination, in loops, or in any order.

At 1502, plural attributes are selected for annotating images generated from, and for interpretation of, seismic amplitude volume. For example, the attributes that are selected can include pre-conditioned seismic attributes, various edge-detection attributes, and edge-enhanced attributes, and/or other combinations of attributes that have been shown to produce optimal results. From 1502, method 1500 proceeds to 1504.

At 1504, plural images are generated from a set of layers of a seismic cube, each image generated using a different attribute of the plural attributes (and using optimal parameters). For example, images associated with the attributes, including images 600, 700, and 800, can be generated, as described above with reference to FIGS. 6, 7, and 8, respectively. From 1504, method 1500 proceeds to 1506.

At 1506, the plural images are blended using customized palettes and initial parameters for each of the plural images. The blending creates a blended image that illuminates discontinuities in the set of layers. Referring to FIG. 10, for example, the image 1000 illustrates initial 3D blended volumes from the pre-conditioned seismic volume of FIG. 6, the edge-detected of FIG. 7, and edge-enhanced volume of FIG. 8. From 1506, method 1500 proceeds to 1508. In some implementations, blending the plural images can include using specific customized color palettes (e.g., color spectrums 1402).

At 1508, optimal parameters are iteratively determined for automatic derivation of fault discontinuities on an interpreter-selected edge-enhanced sub-volume. The iterations are controlled and terminated based on inputs from an interpreter and/or other sources. As described above with reference to FIG. 10, for example, the image 1000 illustrates optimally 3D blended and illuminated seismic cubes, in which blending occurs for the pre-conditioned, edge-detected, and edge-enhanced cubes. When the three component volumes are blended together, e.g., using optimal transparency settings and color palettes, the discontinuities are clearly illuminated. The optimally illuminated result shown in FIG. 10 can then be used to guide an iterative process of determining the most effective settings for the automated fault extraction. Referring to FIG. 11, the image 1100 illustrates automatically extracted discontinuities. In this example, the extraction sampling threshold is set to a top 10%, which only extracts the highest data values. Referring to FIG. 12, the image 1200 illustrates automatically extracted discontinuities, e.g., in which the top 50% of values are used. From 1508, method 1500 proceeds to 1510.

At 1510, the optimal extraction parameters are applied to an entire edge-enhanced volume. For example, the parameters determined from the iterative process can be used on the entire edge-enhanced volume of the original seismic cube. From 1510, method 1500 proceeds to 1512.

At 1512, important extracted fault discontinuities are isolated using commercial filtering tools. For example, stereonet, histogram, and/or other tools can be used alone or in combination to isolate automatically extracted surfaces. From 1514, method 1500 proceeds to 1514.

At 1514, extracted fault patches are refined based on received manual interpretation from the interpreter. For example, using commercial software, a geophysical interpreter can manually refine and interpret key extracted surfaces. From 1514, method 1500 proceeds to 1516.

At 1516, patch results are converted to traditional fault objects for further interpretation and refinement. For example, important seismic discontinuities that may otherwise remain hidden using traditional methodologies can be effectively illuminated, and turnaround time for iterative automated fault extraction and interpretation can be decreased. From 1516, method 1500 stops.

Figure 16:
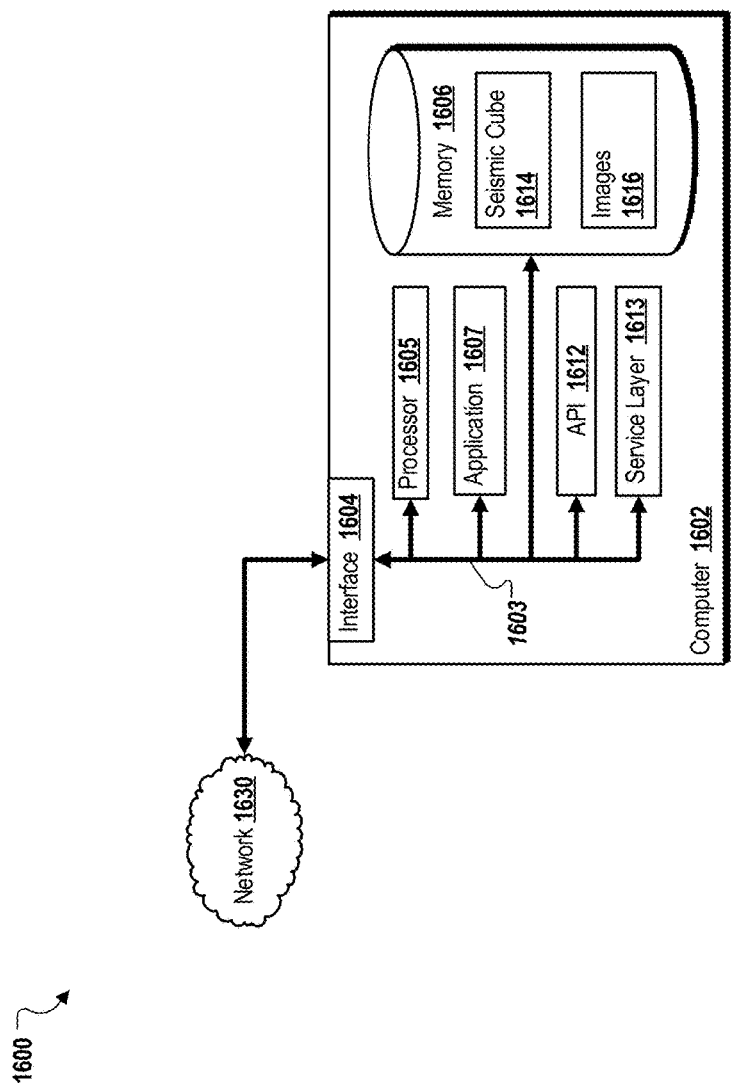
FIG. 16 is a block diagram illustrating an exemplary distributed computer system (EDCS) used for providing parameters for successful automated fault patch extraction, according to an implementation.

FIG. 16 is a block diagram illustrating an exemplary distributed computer system (EDCS) 1600 used for providing parameters for successful automated fault patch extraction, according to an implementation. In some implementations, the EDCS 1600 includes a computer 1602, and network 1630.

The illustrated computer 1602 is intended to encompass a computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. The computer 1602 may comprise a computer that includes an input device, such as a keypad, keyboard, touch screen, or other device (not illustrated) that can accept user information, and an output device (not illustrated) that conveys information associated with the operation of the computer 1602, including digital data, visual and/or audio information, or a user interface.

The computer 1602 can serve as a client and/or a server. The illustrated computer 1602 is communicably coupled with a network 1630. In some implementations, one or more components of the computer 1602 may be configured to operate within a parallel-processing and/or cloud-computing-based environment. Implementations of the computer 1602 can also communicate using message passing interface (MPI) or other interface over network 1630.

At a high level, the computer 1602 is an electronic computing device operable to receive, transmit, process, store, or manage data and information associated with modeling of reservoir formations and lithofacies distribution. According to some implementations, the computer 1602 may also include or be communicably coupled with a simulation server, application server, e-mail server, web server, caching server, streaming data server, business intelligence (BI) server, and/or other server.

The computer 1602 can receive requests over network 1630 from an application 1607 (e.g., executing on another computer 1602) and responding to the received requests by processing the said requests in an appropriate software application 1607. In addition, requests may also be sent to the computer 1602 from internal users (e.g., from a command console or by other appropriate access method), external or third-parties, other automated applications, as well as any other appropriate entities, individuals, systems, or computers.

Each of the components of the computer 1602 can communicate using a system bus 1603. In some implementations, any and/or all the components of the computer 1602, both hardware and/or software, may interface with each other and/or the interface 1604 over the system bus 1603 using an application programming interface (API) 1612 and/or a service layer 1613. The API 1612 may include specifications for routines, data structures, and object classes. The API 1612 may be either computer-language independent or dependent and refer to a complete interface, a single function, or even a set of APIs. The service layer 1613 provides software services to the computer 1602 and/or system of which the computer 1602 is a part. The functionality of the computer 1602 may be accessible for all service consumers using this service layer. Software services, such as those provided by the service layer 1613, provide reusable, defined business functionalities through a defined interface. For example, the interface may be software written in JAVA, C++, or other suitable language providing data in extensible markup language (XML) format or other suitable format. While illustrated as an integrated component of the computer 1602, alternative implementations may illustrate the API 1612 and/or the service layer 1613 as stand-alone components in relation to other components of the computer 1602. Moreover, any or all parts of the API 1612 and/or the service layer 1613 may be implemented as child or sub-modules of another software module, enterprise application, or hardware module without departing from the scope of this disclosure.

The computer 1602 includes an interface 1604. Although illustrated as a single interface 1604 in FIG. 16, two or more interfaces 1604 may be used according to particular needs, desires, or particular implementations of the computer 1602. The interface 1604 is used by the computer 1602 for communicating with other systems in a distributed environment—including a parallel processing environment—connected to the network 1630 (whether illustrated or not). Generally, the interface 1604 comprises logic encoded in software and/or hardware in a suitable combination and operable to communicate with the network 1630. More specifically, the interface 1604 may comprise software supporting one or more communication protocols associated with communications over network 1630.

The computer 1602 includes a processor 1605. Although illustrated as a single processor 1605 in FIG. 16, two or more processors may be used according to particular needs, desires, or particular implementations of the computer 1602. Generally, the processor 1605 executes instructions and manipulates data to perform the operations of the computer 1602. Specifically, the processor 1605 executes the functionality required to model reservoir formations and lithofacies distribution.

The computer 1602 also includes a memory 1606 that holds data for the computer 1602 and/or other components of a system of which the computer is a part. Although illustrated as a single memory 1606 in FIG. 16, two or more memories may be used according to particular needs, desires, or particular implementations of the computer 1602. While memory 1606 is illustrated as an integral component of the computer 1602, in alternative implementations, memory 1606 can be external to the computer 1602. In some implementations, memory 1606 can hold and/or reference one or more of, as described above, a seismic cube 1614 and images 1616 (e.g., images 500, 600, 700, 800, 900, 1100, and 1200).

The application 1607 is an algorithmic software engine providing functionality according to particular needs, desires, or particular implementations of the computer 1602 and/or a system of which the computer 1602 is a part, particularly with respect to functionality required to support processes for automated fault extraction and interpretation, as described above. In some implementations, software applications can include one or more of the above-described.

Although illustrated as a single application 1607, the application 1607 may be implemented as multiple applications 1607 on the computer 1602. In addition, although illustrated as integral to the computer 1602, in alternative implementations, the application 1607 can be external to and execute apart from the computer 1602.

There may be any number of computers 1602 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 1602, or that one user/process may use multiple computers 1602.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer system, comprising:
   at least one computer interoperably coupled with a memory storage and configured to:
   selecting plural attributes for annotating images generated from, and for interpretation of, seismic amplitude volume;
   generating plural images from a set of layers of a seismic cube, each image generated using a different attribute of the plural attributes;
   blending the plural images, using customized palettes and initial parameters for each of the plural images, the blending creating a blended image that illuminates discontinuities in the set of layers;
   iteratively determining optimal parameters for automatic derivation of fault discontinuities on an interpreter-selected edge-enhanced sub-volume, wherein iterations are controlled and terminated based on inputs from an interpreter;
   applying the optimal extraction parameters to an entire edge-enhanced volume;
   isolating important extracted fault discontinuities using commercial filtering tools;
   refining extracted fault patches based on received manual interpretation from the interpreter; and
   converting patch results to traditional fault objects for further interpretation and refinement.

2. The computer system of claim 1, further configured to receive the seismic cube.

3. The computer system of claim 1, wherein the plural attributes include pre-conditioned seismic attributes, edge-detection attributes, and edge-enhanced attributes, and wherein blending the plural images includes blending images generated from the pre-conditioned seismic attributes, the edge-detection attributes, and the edge-enhanced attributes.

4. The computer system of claim 3, wherein the optimal parameters for the pre-conditioned seismic attributes, the edge-detection attributes, and the edge-enhanced attributes include opacities of 70%, 40%, and 30%, respectively.

5. The computer system of claim 3, wherein blending the plural images further includes using specific customized color palettes.

6. The computer system of claim 1, wherein the initial parameters include a 10% extraction sampling threshold.

* * * * *